United States Patent Office 2,927,933
Patented Mar. 8, 1960

2,927,933

2-OXYMETHYLENE-11-OXYGENATED-17α-ALKYLTESTOSTERONES

John C. Babcock, Portage Township, Kalamazoo County, John A. Hogg, Kalamazoo Township, Kalamazoo County, and Raymond L. Pederson, Kalamazoo, Mich., assignors to The Upjohn Company, Kalamazoo, Mich., a corporation of Delaware No Drawing. Application April 17, 1959
Serial No. 807,002

5 Claims. (Cl. 260—397.45)

This invention relates to novel steroids of the androstane series and is more particularly concerned with 2-hydroxymethylene-11β,17β-dihydroxy-17α-alkyl-4-androsten-3-ones,
2-hydroxymethylene-17β-hydroxy-17α-alkyl-4-androstene-3,11-diones,
2-alkoxymethylene-11β,17β-dihydroxy-17α-alkyl-4-androsten-3-ones,
2-alkoxymethylene-17β-hydroxy-17α-alkyl-4-androstene-3,11-diones, and methods used in the preparation thereof.

The novel compounds of this invention are represented by the formula:

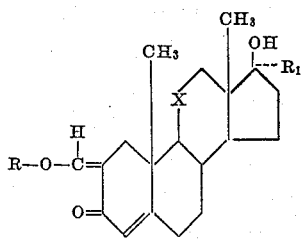

wherein R is hydrogen or an alkyl radical of from 1 to 8 carbon atoms, inclusive, e.g., methyl, ethyl, propyl, butyl, amyl, hexyl, heptyl, octyl, isopropyl, isobutyl, 3-methylpentyl, and the like; $R_1$ is an alkyl radical, as defined above, and X is selected from the group consisting of the hydroxymethylene radical (>CHOH), and the carbonyl radical (>C=O).

The novel products of this invention, the compounds of Formula I, possess useful therapeutic properties. They are orally active anabolic-androgenic agents. The compounds of Formula I affect the secretion of gonadotropins and thus regulate ovulation and endometrial and placental development, reduce fertility and constitute effective therapy for dysmenorrhea, amenorrhea, endometriosis, threatened abortion and related gynecological disorders. Administration of the steroids of Formula I can be in conventional dosage forms such as pills, tablets, capsules, syrups, or elixirs for oral use, or in liquid forms which are adaptable to the natural and synthetic steroid hormones for injectable products.

The compounds of Formula I, when R is hydrogen, namely, 2-hydroxymethylene-11β,17β-dihydroxy-17α-alkyl-4-androsten-3-ones and
2-hydroxymethylene-17β-hydroxy-17α-alkyl-4-androstene-3,11-diones, are also useful as intermediates in the production of the corresponding 2,17α-dialkyl compounds, namely, 2,17α-dialkyl-11β,17β-dihydroxy-4-androsten-3-ones, and
2,17α-dialkyl-17β-hydroxy-4-androstene-3,11-diones, respectively, according to the procedures disclosed in our copending application Serial Number 547,309, filed November 16, 1955, now U.S. Patent 2,883,401, granted April 21, 1959.

The compounds of Formula I are prepared according to the reaction scheme which follows:

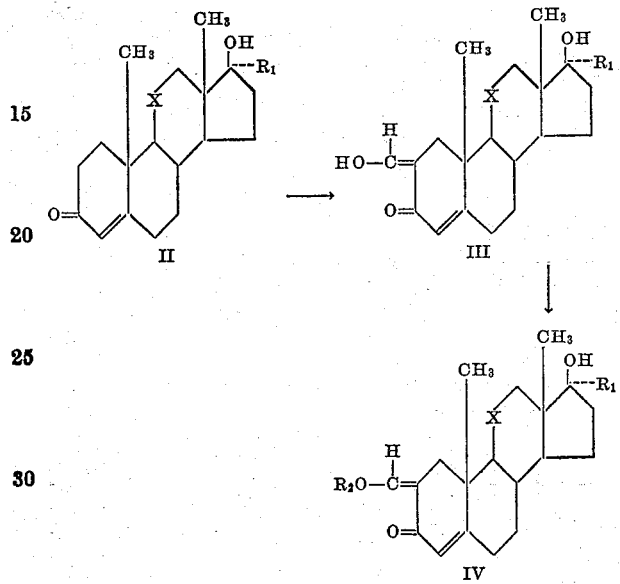

wherein $R_1$ and X have the same meanings previously given and $R_2$ is an alkyl radical of from 1 to 8 carbon atoms, inclusive, e.g., methyl, ethyl, propyl, butyl, amyl, hexyl, heptyl, octyl, isopropyl, isobutyl, 3-methylpentyl, and the like.

According to the present invention, the compounds of Formula II, for example 17α-methyl-11β,17β-dihydroxy-4-androsten-3-one, are treated with a lower-alkyl formate, e.g., methyl formate, ethyl formate, propyl formate, butyl formate, isopropyl formate, or the like, to obtain the compounds of Formula III, for example, 2-hydroxymethylene-11β,17β-dihydroxy-17α-methyl-4-androsten-3-one. The conversion of the compounds of Formula II to the compounds of Formula III is carried out in the presence of an inert organic solvent, preferably a nonpolar, nonprototropic solvent, e.g., benzene, toluene, dioxane, preferably benzene, and a base, for example, an alkali-metal alkoxide, e.g., sodium methoxide, sodium tertiary butoxide and the like, or an alkali-metal hydride, e.g., sodium hydride and the like. Tertiary butyl alcohol also serves as a suitable solvent in the reaction for the conversion of the compounds of Formula II to the compounds of Formula III.

The thus-obtained compounds of Formula III are then treated with an alkyl halide, for example, methyl iodide, ethyl iodide, propyl iodide, butyl iodide, amyl iodide, hexyl iodide, heptyl iodide, octyl iodide, isopropyl iodide, isobutyl iodide, 3-methylpentyl iodide or the like, or the corresponding bromo or chloro compounds thereof, to obtain the compounds of Formula IV, for example, 2-methoxymethylene-11β,17β-dihydroxy-17α-methyl-4-androsten-3-one. The conversion of the compounds of Formula III to the compounds of Formula IV is carried out in the presence of an alkali-metal salt of a weak acid, for example, potassium carbonate, sodium bicarbonate, potassium formate, sodium acetate, and the like; and

EXAMPLE 1

*2-hydroxymethylene-11β,17β-dihydroxy-17α-methyl-4-androsten-3-one (III)*

(A) To a solution of 250 mg. of 11β,17β-dihydroxy-17α-methyl-4-androsten-3-one (II) dissolved in 15 ml. of benzene there is added a suspension of 500 mg. of powdered sodium methoxide in 10 ml. of benzene followed by the addition of 4 ml. of ethyl formate. The reaction mixture is allowed to stir for about 24 hours under an atmosphere of nitrogen. The mixture which is thus obtained is mixed with ice water to give an aqueous and an organic layer. The aqueous layer is separated and carefully acidified with ice cold dilute hydrochloric acid to give a precipitate which is crystallized from an ethyl acetate-Skellysolve B hexanes mixture to give 2-hydroxymethylene-11β,17β-dihydroxy-17α-methyl-4-androsten-3-one (III), a crystalline solid.

Similarly, substituting other alkyl formates, such as methyl formate, propyl formate, butyl formate, isopropyl formate and the like for the ethyl formate described above is productive of 2-hydroxymethylene-17β-hydroxy-17α-methyl-4-androsten-3-one.
androsten-3-ones, for example, 11β,17β-dihydroxy-17α-

In like manner, substituting a stoichiometric equivalent amount of other 11β,17β-dihydroxy-17α-alkyl-4-ethyl-4-androsten-3-one, 11β,17β-dihydroxy-17α-propyl-4-androsten-3-one, and the like, for 11β,17β-dihydroxy-17α-methyl-4-androsten-3-one is productive of the corresponding 2-hydroxymethylene-11β,17β-dihydroxy-17α-alkyl-4-androsten-3-one, for example, 2-hydroxymethylene-11β,17β-dihydroxy-17α-ethyl-4-androsten-3-one, 2-hydroxymethylene-11β,17β-dihydroxy-17α-propyl-4-androsten-3-one, and the like.

Likewise, substituting a stoichiometric equivalent amount of 17β-hydroxy-17α-alkyl-4-androstene-3,11-dione, for example, 17β-hydroxy-17α-methyl-4-androstene-3,11-dione, for 11β,17β-dihydroxy-17α-methyl-4-androsten-3-one in the procedure of Example 1A is productive of the corresponding 2-hydroxymethylene-17β-hydroxy-17α-alkyl-4-androstene-3,11-dione, for example, 2-hydroxymethylene-17β-hydroxy-17α-methyl-4-androstene-3,11-dione.

(B) To a solution of 250 mg. of 11β,17β-dihydroxy-17α-methyl-4-androsten-3-one (II) there is added 250 mg. of sodium hydride in 10 ml. of benzene followed by the addition of 4 ml. of ethyl formate. The thus-obtained mixture is stirred at room temperature for about 24 hours, under an atmosphere of nitrogen. Following the stirring, the reaction mixture is filtered and the precipitate which is obtained is washed with benzene and dried in vacuo to leave a residue. The thus-obtained residue is carefully acidified with ice cold hydrochloric acid and recrystallized from an ethyl acetate-Skellysolve B hexanes mixture to give 2-hydroxymethylene-11β,17β-dihydroxy-17α-methyl-4-androsten-3-one (III), a crystalline solid.

Similarly, substituting other alkyl formates, such as those listed in Example 1A, for the ethyl formate described above is productive of 2-hydroxymethylene-11β,17β-dihydroxy-17α-methyl-4-androsten-3-one.

In like manner, substituting a stoichiometric equivalent amount of the starting compounds given in the penultimate paragraph of Example 1A for 11β,17β-dihydroxy-17α-methyl-4-androsten-3-one is productive of the corresponding products given in the penultimate paragraph of Example 1A.

Likewise, substituting a stoichiometric equivalent amount of the starting compounds given in the last paragraph of Example 1A for 11β,17β-dihydroxy-17α-methyl-4-androsten-3-one is productive of the corresponding products given in the last paragraph of Example 1A.

EXAMPLE 2

*2-methoxymethylene-11β,17β-dihydroxy-17α-methyl-4-androsten-3-one (IV)*

To a solution of 250 mg. of 2-hydroxymethylene-11β,17β-dihydroxy-17α-methyl-4-androsten-3-one (III) dissolved in 20 ml. of dry acetone there is added 1 g. of potassium carbonate and 1 ml. of methyl iodide and the reaction mixture thus obtained is stirred for about 24 hours. Following the reaction, the solvent is removed by evaporation leaving a residue. The residue is partitioned between water and ether and the ether layer thus obtained is washed with 2% sodium hydroxide solution followed by drying of the ether solution over potassium carbonate. The thus-obtained dry ether solution is evaporated to leave a residue containing 2-methoxymethylene-11β,17β-dihydroxy-17α-methyl-4-androsten-3-one (IV). The residue is dissolved in 5 ml. of benzene and chromatographed over a column containing 12 g. of Florisil (synthetic magnesium silicate). Elution with increasing proportions of acetone in Skellysolve B hexanes yields, first, 2,17α-dimethyl-11β,17β-dihydroxy-4-androsten-3-one. Further elution with increasing proportions of acetone in Skellysolve B hexanes produces fractions which slowly give a positive test with alcoholic ferric chloride. The fractions giving the alcoholic ferric chloride color test are combined and the solvent evaporated therefrom to yield 2-methoxymethylene-11β,17β-dihydroxy-17α-methyl-4-androsten-3-one (IV).

Similarly, substituting methyl bromide or methyl chloride for methyl iodide in the above reaction is productive of 2-methoxymethylene-11β,17β-dihydroxy-17α-methyl-4-androsten-3-one.

In like manner, substituting another alkyl iodide (or other halide) for the methyl halide above is productive of the corresponding 2-alkoxymethylene-11β,17β-dihydroxy-17α-methyl-4-androsten-3-one, for example, 2-ethoxymethylene-11β,17β-dihydroxy-17α-methyl-4-androsten-3-one, 2-propoxymethylene-11β,17β-dihydroxy-17α-methyl-4-androsten-3-one and the like.

Likewise, substituting a stoichiometric equivalent amount of other 2-hydroxymethylene-11β,17β-dihydroxy-17α-alkyl-4-androsten-3-ones, for example, 2-hydroxymethylene-11β,17β-dihydroxy-17α-ethyl-4-androsten-3-one, 2-hydroxymethylene-11β,17β-dihydroxy-17α-propyl-4-androsten-3-one, and the like, for 2-hydroxymethylene-11β,17β-dihydroxy-17α-methyl-4-androsten-3-one is productive of the corresponding 2-methoxymethylene-11β,17β-dihydroxy-17α-alkyl-4-androsten-3-ones, for example, 2-methoxymethylene-11β,17β-dihydroxy-17α-ethyl-4-androsten-3-one, 2-methoxymethylene-11β,17β-dihydroxy-17α-propyl-4-androsten-3-one, and the like.

Similarly, substituting a stoichiometric equivalent amount of 2-hydroxymethylene-17β-hydroxy-17α-alkyl-4-androstene-3,11-dione, for example, 2-hydroxymethylene-17β-hydroxy-17α-methyl-4-androstene-3,11-dione, for 2-hydroxymethylene-11β,17β-dihydroxy-17α-methyl-4-androsten-3-one in the procedure of Example 2 is productive of the corresponding 2-methoxymethylene-17β-hydroxy-17α-alkyl-4-androstene-3,11-dione, for example, 2-methoxymethylene-17β-hydroxy-17α-methyl-4-androstene-3,11-dione.

This application is a continuation-in-part of copending application Serial No. 547,309, filed November 16, 1955, now U.S. Patent 2,883,401, granted April 21, 1959.

It is to be understood that the invention is not to be limited to the exact details of operation or exact compounds shown and described, as obvious modifications and equivalents will be apparent to one skilled in the art, and the invention is therefore to be limited only by the scope of the appended claims.

What is claimed is:
1. A 17α-alkyl steroid of the following formula:

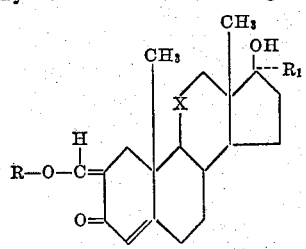

wherein R is selected from the group consisting of hydrogen and an alkyl radical containing from 1 to 8 carbon atoms, inclusive, $R_1$ is an alkyl radical containing from 1 to 8 carbon atoms, inclusive, and X is selected from the group consisting of the β-hydroxy-methylene radical and the carbonyl radical.

2. 2 - hydroxymethylene - 11β,17β - dihydroxy - 17α-methyl-4-androsten-3-one.

3. 2-hydroxymethylene - 17β - hydroxy - 17α - methyl-4-androstene-3,11-dione.

4. 2 - methoxymethylene - 11β,17β - dihydroxy - 17α-methyl-4-androsten-3-one.

5. 2-methoxymethylene - 17β - hydroxy - 17α - methyl-4-androstene-3,11-dione.

References Cited in the file of this patent

UNITED STATES PATENTS

| | | |
|---|---|---|
| 2,281,622 | Ruzicka | May 5, 1942 |
| 2,852,537 | Ringold et al. | Sept. 16, 1958 |
| 2,883,401 | Babcock et al. | Apr. 21, 1959 |

OTHER REFERENCES

Weisenborn et al.: J. Am. Chem. Soc., vol. 76 (January 20, 1954), pages 552–555.

Ringold et al.: J. Am. Chem. Soc., vol. 81 (January 20, 199), pages 427, 432.

UNITED STATES PATENT OFFICE
CERTIFICATE OF CORRECTION

Patent No. 2,927,933            March 8, 1960

John C. Babcock et al.

It is hereby certified that error appears in the printed specification of the above numbered patent requiring correction and that the said Letters Patent should read as corrected below.

Column 3, line 29, strike out "androsten-3-ones, for example, 11β,17β-dihydroxy-17α-" and insert the same after "-alkyl-4-" in line 31, same column 3.

Signed and sealed this 23rd day of August 1960.

(SEAL)

Attest:

KARL H. AXLINE
Attesting Officer

ROBERT C. WATSON
Commissioner of Patents